US009262903B2

United States Patent
Kamalakannan et al.

(10) Patent No.: US 9,262,903 B2
(45) Date of Patent: Feb. 16, 2016

(54) SYSTEM AND METHOD TO MONITOR EVENTS AND PERSONNEL LOCATIONS

(71) Applicant: Honeywell International Inc., Morristown, NJ (US)

(72) Inventors: Arunkumar Kamalakannan, Tamilnadu (IN); Sateesh Kumar Nukala, Karnataka (IN); Shashikant G. Gulaguli, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/052,013

(22) Filed: Oct. 11, 2013

(65) Prior Publication Data

US 2015/0102926 A1    Apr. 16, 2015

(51) Int. Cl.
| | |
|---|---|
| G08B 1/08 | (2006.01) |
| G08B 21/02 | (2006.01) |
| G06Q 10/06 | (2012.01) |
| G06Q 50/26 | (2012.01) |
| G07C 9/00 | (2006.01) |

(52) U.S. Cl.
CPC ............ *G08B 21/02* (2013.01); *G06Q 10/0631* (2013.01); *G06Q 50/265* (2013.01); *G07C 9/00111* (2013.01)

(58) Field of Classification Search
USPC ............... 340/539.1, 539.11, 539.13, 529.16, 340/539.17, 539.2, 539.21, 539.22, 539.23, 340/539.25, 539.26, 540, 541, 542, 5.1, 5.2, 340/5.21, 5.22, 5.3, 5.31, 5.32, 5.33, 5.7, 340/5.73, 5.74, 6.1; 705/7.11–7.16
See application file for complete search history.

(56) References Cited

U.S. PATENT DOCUMENTS

| | | | |
|---|---|---|---|
| 6,242,896 B1 | 6/2001 | Nieberger | |
| 6,700,533 B1* | 3/2004 | Werb et al. | 342/357.48 |
| 7,298,258 B1* | 11/2007 | Hudgens et al. | 340/539.13 |
| 2003/0024992 A1* | 2/2003 | Lewis | 235/472.01 |
| 2004/0241627 A1* | 12/2004 | Delfing | 434/219 |
| 2005/0181337 A1 | 8/2005 | Shaw | |
| 2006/0268482 A1* | 11/2006 | Lin et al. | 361/62 |
| 2009/0003832 A1* | 1/2009 | Pederson et al. | 398/135 |
| 2009/0040014 A1* | 2/2009 | Knopf et al. | 340/5.1 |

(Continued)

FOREIGN PATENT DOCUMENTS

| | | |
|---|---|---|
| CN | 201984471 U | 9/2011 |
| CN | 202196396 U | 4/2012 |

(Continued)

OTHER PUBLICATIONS

Extended European search report from corresponding EP application 14185204.6, dated Feb. 27, 2015.

(Continued)

*Primary Examiner* — Travis Hunnings
(74) *Attorney, Agent, or Firm* — Conley Rose, P.C.; Kristin Jordan Harkins

(57) ABSTRACT

A method and apparatus where the apparatus performs the steps of receiving a location of a person; determining via a database a hazard level of the location confirming via a database that the person is qualified to be present at the location based upon a training level of the person for the determined hazard level of the location and wirelessly notifying the person to leave the location upon determining that the person is not qualified for the hazard level of the location based upon the training level of the person.

18 Claims, 2 Drawing Sheets

(56) References Cited

U.S. PATENT DOCUMENTS

| | | |
|---|---|---|
| 2009/0167260 A1 | 7/2009 | Pauritsch et al. |
| 2009/0234690 A1* | 9/2009 | Nikipelo ............................ 705/7 |
| 2010/0188187 A1* | 7/2010 | Mughal et al. ................. 337/225 |
| 2010/0321180 A1* | 12/2010 | Dempsey et al. ......... 340/539.12 |
| 2010/0332293 A1* | 12/2010 | Merchant ......................... 705/11 |
| 2011/0022421 A1 | 1/2011 | Brown et al. |
| 2011/0115623 A1 | 5/2011 | Gnanasekaran et al. |
| 2011/0231983 A1* | 9/2011 | Chan ................................. 2/167 |
| 2012/0044047 A1* | 2/2012 | Morgan .......................... 340/5.2 |
| 2013/0170417 A1 | 7/2013 | Thomas et al. |
| 2013/0193865 A1 | 8/2013 | Keller et al. |
| 2014/0283144 A1* | 9/2014 | Gettings et al. ................. 726/30 |

FOREIGN PATENT DOCUMENTS

| | | |
|---|---|---|
| CN | 202383806 U | 8/2012 |
| FR | 2 934 703 A1 | 2/2010 |

OTHER PUBLICATIONS

Extended European search report from corresponding EP patent application 15152166.3, dated Jun. 26, 2015.

Wikipedia, Buck Converter, Retrieved from the Internet: URL: https://en.wikipedia.org/wiki/Buck_converter, retrieved on Jun. 12, 2015.

* cited by examiner

SYSTEM AND METHOD TO MONITOR EVENTS AND PERSONNEL LOCATIONS

FIELD

The field of the invention relates to industrial safety and more particularly to the protection of personnel within hazardous areas.

BACKGROUND

Hazards are often present within many industrial environments. The hazards may be due to any of a number of different circumstances (e.g., toxic gases, explosive gases, lack of oxygen, radiation, etc.).

In most cases, the industrial environment is designed to minimize the possibility of such hazards. However, persons who work in such areas must be constantly on guard for malfunctions or other circumstances that present such hazards.

Environmental testing is often key to the protection of personnel within such areas. For example, portable (or stationary) gas detectors may detect hazardous gases and sound an alarm when such gases exceed a safety limit.

Personal protective equipment (PPE) may also be used to reduce the risks to people within such areas. Protective equipment may include special clothing and/or masks that cover the body and/or head of the individual. The PPE may include an air tank of breathable air.

While such equipment is effective, it is of little use absent proper training. However, even training may not be effective in the event of carelessness. Accordingly, a need exists for better methods of protecting people in hazardous areas.

DETAILED DESCRIPTION OF AN ILLUSTRATED EMBODIMENT

Figure 1:
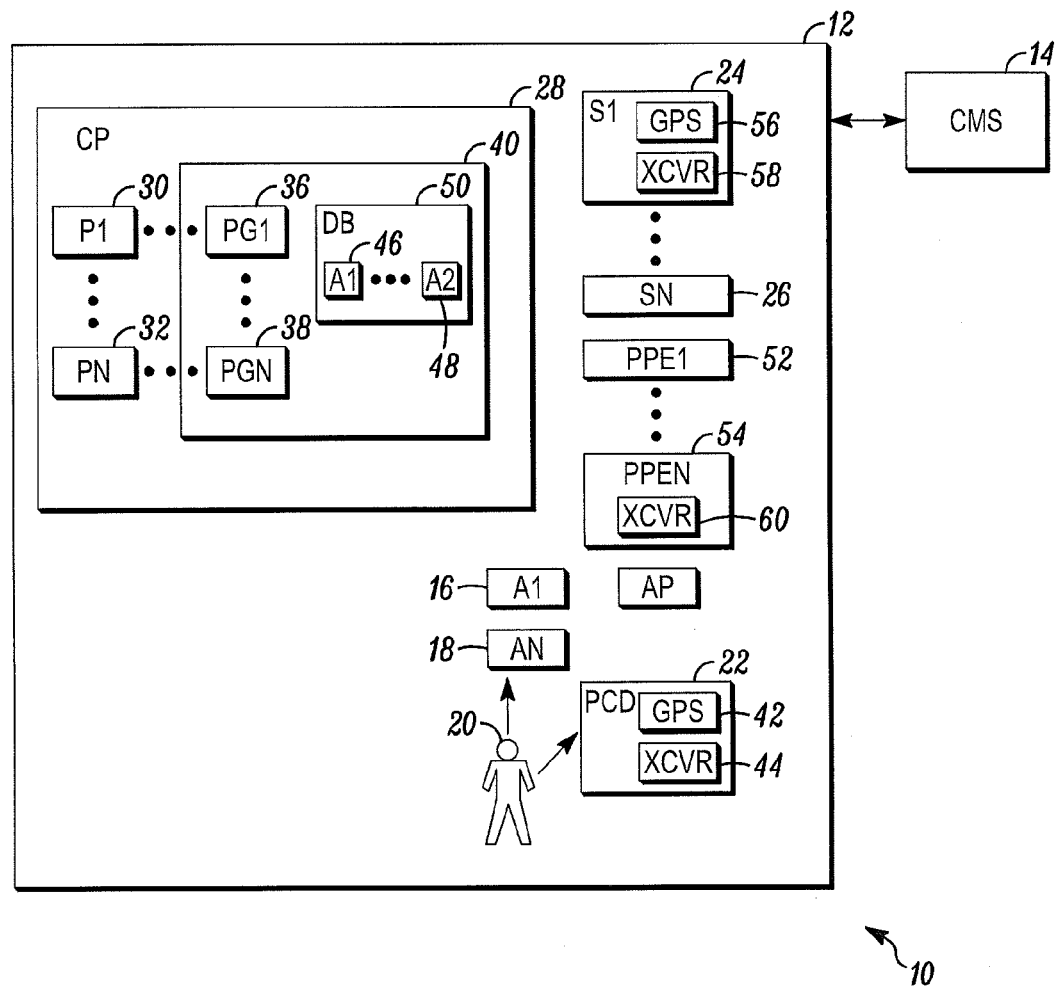
FIG. 1 depicts a safety system depicted within a context of use generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 depicts a safety monitoring system 10 used within a secured area 12. The safety monitoring system 10 may be a stand-alone system used within the secured area or may be incorporated into a security system that monitors the secured area for threats to safety and health and report such threats to a central monitoring station 14.

The secured area may be divided into one or more geographic areas 16, 18 based upon the scale or type of threat to safety and/or health. Threats to safety and/or health may include any one or more known risks (e.g., toxic gases, explosive gases, lack of oxygen, radiation, electrocution, etc.) associated with that area. In this regard, each of the areas may have a respective hazard rating based upon the type and scope of threat.

Each of the areas may also have a safety criteria associated with the area. The criteria may include a description of the threat(s) and the training and equipment required to deal with each known risk associated with each area. The training may include a description about the use of a set of safety steps and any equipment needed to deal with each risk.

From time to time, a person 20 may need to enter and to perform certain duties at a particular location within one of the hazardous areas. The person may carry a personal communication device 22 that interacts with the safety monitoring system 10 for the protection of the person.

Also available within the secured area is one or more environmental sensors 24, 26 that detect one or more respective threats within the hazardous areas. The environmental sensors may be provided in the form of one or more stationary devices located within each of the hazardous areas or may be provided as portable devices that may be carried by the person into the hazardous areas.

The safety monitoring system includes a control panel 28. Located within the control panel 28, the personal communication device 22 and, upon occasion, each of the sensors 24, 26 is one or more processor apparatus (processors) 30, 32 executing one or more computer programs 36, 38 loaded from a non-transitory computer readable medium (memory) 40. As used herein, reference to a step performed by a computer program is also reference to the processor that executed that step.

Included within the personal communication device is a positioning device (e.g., a global positioning system (GPS), inertial navigation device, etc.) 42 that detects an instantaneous location of the person. A transceiver (XCVR) 44 exchanges signals with a corresponding transceiver and server within the control panel to report the location of the person to the control panel.

In general, each of the hazardous areas 16, 18 has a corresponding file 46, 48 within a database 50 that lists the geographical coordinates of each area and each known risk of that area. Also included within the database may be a list of persons certified as trained in each risk and the equipment needed in dealing with that risk.

For example, in the case of toxic gases, the criteria may include a requirement for a toxic gas detector (sensor) 24, 26 that is able to detect and warn the person of the presence of toxic gases. The criteria may also include a requirement for personal protective equipment (PPE) 52, 54. The PPE in this case may include protective clothing. The protective clothing may include headgear and, possibly, breathing apparatus (e.g., a filter, an air tank, etc.). Alternatively, or in addition, the PPE may include lock out or tag out devices.

During use, a tracking processor of the control panel may track the position of the person in real time. In this regard, the tracking processor may periodically query a corresponding processor within the personal communication device for its location or the corresponding processor may simply retrieve its current location and periodically send the coordinates to the tracking processor.

As the tracking processor or another positioning processor receives the coordinates of the person, the tracking or other processor compares the coordinates with the coordinates of each hazardous area 16, 18 to detect entry of the person into one of the hazardous areas. Upon detection of entry by the person into one of the areas, the tracking processor may transfer an identifier of the person and entered area to a safety evaluation processor.

Figure 2:
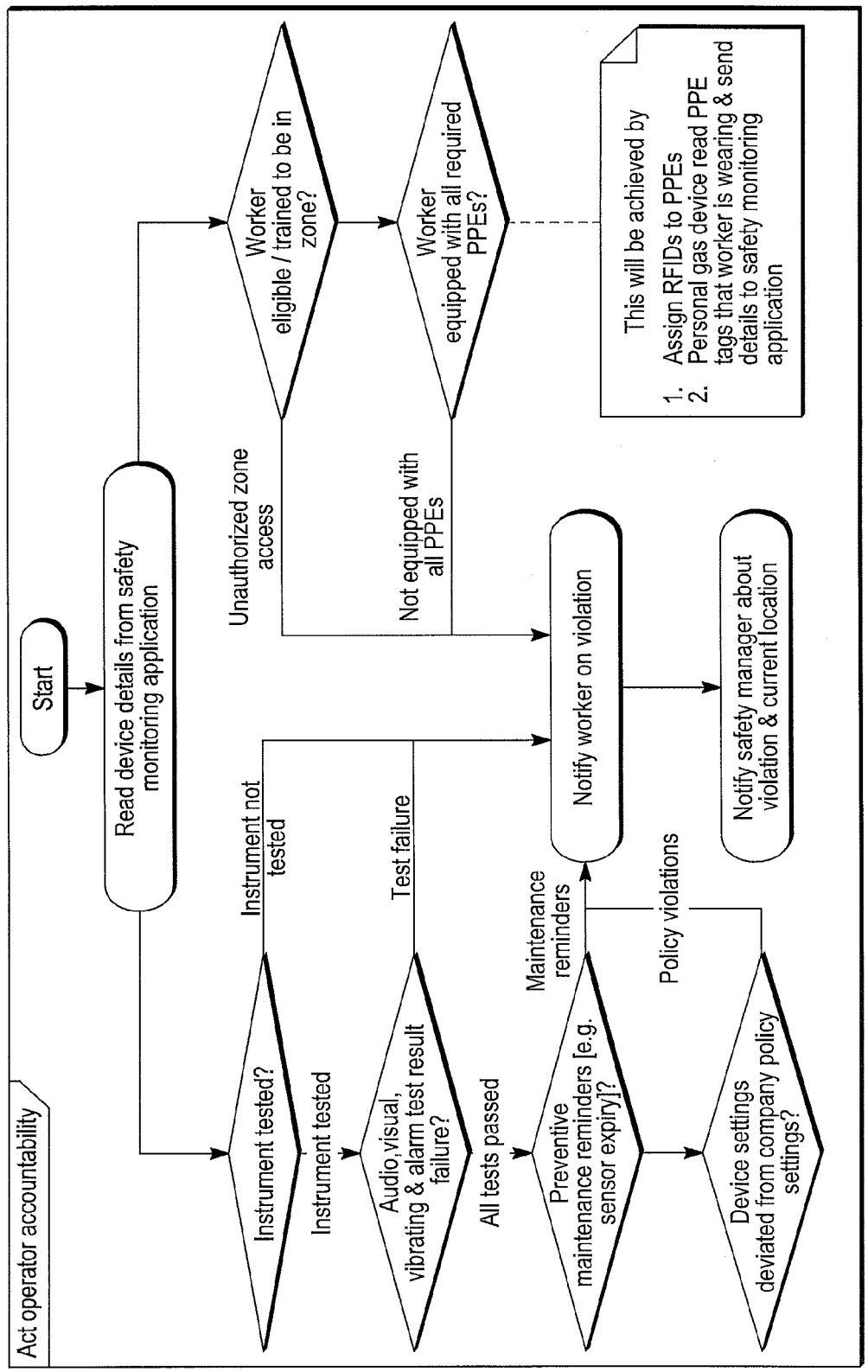
FIG. 2 depicts method steps that may be used by the system of FIG. 1.

The safety evaluation processor may perform a number of steps as shown in FIG. 2 in order to ensure the safety of the person. In this regard, the safety processor or other processor may retrieve the safety criteria for the entered area to determine if the person is certified (has been trained) in dealing with the risks associated with the area. In this regard, the safety processor may first retrieve a list of risks for the entered area from the database and compare each of those risks for the certifications associated with the person. If there is a one-for-one match between the known risks and certifications, then the safety processor goes on to the next step. If there is a known risk associated with the entered area for which the person has not been trained (i.e., the person does not have a certification that corresponds to the known risk), then the safety processor wirelessly sends a warning or other notification to the person. In this case, the warning may be a message that activates an audible and/or visual warning indicator on the communication device carried by the person. The warning may also include a text message presented on a display of the device that identifies the risk and training that the person needs in order to remain in that area.

If the person has the necessary certifications to be present within the entered area, then the safety processor next retrieves a list of any equipment needed by the person to remain in the entered area including any sensors and/or PPE. If the criteria identifies any sensors, then the safety processor may determine if any sensors of the required type are present within the entered area. The safety processor may first consult a list of stationary sensors to determine if the coordinates of the stationary sensor matches the coordinates of the entered area.

Next, the safety processor may attempt to determine a location of any portable sensors that may be carried by the person. In this regard, the safety processor may send a location query through a transceiver 58 to a corresponding processor of each sensor within the secured area requesting location information. The corresponding processor may retrieve a current location from a GPS 56 and return the information to the safety processor. If the coordinates of the sensor match the coordinates of the entered area, then the safety processor concludes that at least a first portion of the equipment requirement criteria has been met.

Alternatively, the safety processor may simply determine if a sensor of the required type is permanently assigned to (and is to be carried by) the person. Under this scenario, there may be no need for the safety processor to confirm the geographical location of the sensor because it would be assumed to be carried by the person.

In this case, if a stationary sensor or portable sensor is confirmed to be in the entered area or a sensor is permanently assigned to the person, then the safety processor may assume that the sensor portion of the criteria has been met. Otherwise, the safety processor may send a warning to the person. As above, the warning may include a text message setting forth the deficiency associated with the person's presence in the entered area.

As a final step of the equipment portion of the criteria, the safety processor may identify any PPE required for the person's presence in the entered area. This information would be retrieved from the criteria associated with the entered area. As a next step, the safety processor may attempt to determine if any required PPE is being used by the person.

It may be noted in this regard that the PPE may include a transponder 60 (e.g., a radio frequency identifier (RFID) tag) embedded into or attached to the PPE. In this regard, the transponder 60 may communicate with the transceiver 44 of the personal communication device carried by the person via a short range communication protocol (e.g., Bluetooth).

To confirm the presence of any required PPE, the personal communication device may receive an instruction from the safety processor to identify any PPE that is being worn by or is near the person. The communication device may query the transponder 60 and return an identifier of the PPE to the safety processor. If the safety processor can match the identifier with the PPE information of the criteria for the entered area, then this requirement may also be deemed to have been met.

Alternatively, the safety processor may determine if the required PPE is permanently assigned to (or has been recently checked out of a common storage area) by the person, then the safety processor may again determine that this requirement of the criteria has been met without any need for confirmation of the physical location of the PPE. If not, then the safety processor may send a warning message to the personal communication device warning the person of the need for the PPE. As above, the warning may include a text message identifying the deficiency.

On another level, the safety processor may determine that the person has the wrong PPE or sensor. In this case, the safety processor may send a warning to the person that the wrong PPE or sensor has been carried for the given location of the person.

On another level, the safety processor may operate on a group level based upon group resources. For example, a group of persons may operate within a particular area so long as each person has the necessary PPE and/or the group has at least one piece of equipment that would be effective for the protection of the group as a whole. For example, a group working in a relatively small area would only need one of each required gas detector or one lock out tag or tag out device.

In this situation, the detection of each person that arrives at the location of a hazardous area would involve a slightly different procedure. In this case, the arrival of the person would involve determining the number of persons within the hazardous area even though the location of each are slightly different.

Similarly, as each person departs an area, the safety processor may need to identify any sensors carried by that person, whether any persons within that same group remain within that same area and whether the departure of that person leaves the remainder of the group without all of the necessary equipment.

In order to facilitate the handling of groups, a unique message may need to be prepared in advance and saved into the database. As each person leaves an area, the safety processor may need to determine via the database an alert description and targeted notification group for each location. Similarly, as each person leaves the area, the safety processor may need to determine via the database an alert description and targeted notification group for each hazard level.

In addition to sending a warning to the person, the safety processor may also send a warning or other notification (e.g., e-mail, voice mail, etc.) to a safety manager. The notification may be saved in a database of infractions by type of infraction or by person present within the secured area.

The safety processor may also operate to ensure the accuracy and reliability of the sensors. This may be performed via a search of an instrument database or by control of the sensor itself. For example, the safety processor may send an instruction through the transceiver 58 of the sensor to a test processor within the sensor to test the instrument or may retrieve test data from the instrument database. If the instrument cannot be or hasn't previously been tested, then the safety processor may send a warning to the person(s) within the area. Similarly, if there is a test failure and the sensor provides audio, visual, vibrating or other indication of an alarm test result failure, then the safety processor will send notification to the person(s).

If the test succeeds, then the safety processor may retrieve maintenance records. If the sensor is due for calibration (i.e., the sensor calibration interval has expired), then the safety processor may send a warning notification to the person(s).

Similarly, the safety processor may send an instruction to the sensor asking for the device settings of the sensor. The safety processor may compare these settings with a set of settings established under company policy. If there are any differences, the safety processor may return a warning notification to the person(s).

In general, the described system provides a mechanism for operator/device compliance with national and local safety requirements. By monitoring the location of personnel within the secured area, the system is able to generate and display alerts and warnings in a central station for a variety of different events. For example, safety advices/notifications about violations such as missing mandated safety devices (e.g., gas sensor, PPE, etc.) can be sent to the appropriate personnel. Sensor or PPE calibration due messages can be sent. The expiration of PPE or sensor calibration test periods can be detected and notifications sent. Untested devices can be detected and notifications sent. Bump test due messages can be sent. The entry of untrained operators (persons) into hazardous areas can be detected and notifications sent.

Similarly, the use of lock out/tag out devices can be detected via the transponders 60. This can result in tagging alerts of safety violations being sent to the person(s).

The above system may be used to warn the untrained operator not to enter a zone based upon current operator location information. Untrained in this case refers to lack of training in operating or using PPE equipment or in terms of unknown toxic materials present within the area which are not familiar to the operator. This may be accomplished by linking of operator databases having all of the training details, etc.

The tracking of operator location can also be used to ensure accurate time records. For example, the system can be used to enforce certain regimens of working hours (e.g., planned working hours versus actual working hours).

The database of violations may also be searched for common traits. In this case, subscription to critical events by a safety manager (team) ensures timely notification of critical events.

The system offers other benefits. For example, the detection of the location of operators provides a systematic way of adhering to safety guidelines. The system offers a way of automated alerting or notification method of safety violations to the plant safety team. The recognition of location tagged safety violations aids in faster response. The system improves post incident analysis (PIA) by tagging safety violations of the operators with the incidents. This aids in OSHA/NIOSH compliance.

In general, the system includes an apparatus that performs a number of steps including receiving a location of a person, determining via a database a hazard level of the location, confirming via a database that the person is qualified to be present at the location based upon a training level of the person for the determined hazard level of the location and wirelessly notifying the person to leave the location upon determining that the person is not qualified for the hazard level of the location based upon the training level of the person.

In alternate embodiments, the apparatus includes a processor that receives a location of a person, a processor that determines via a database a hazard level of the location, a processor that confirms via a database that the person is qualified to be present at the location based upon a training level of the person for the determined hazard level of the location and a processor that wirelessly notifies the person to leave the location upon determining that the person is not qualified for the hazard level of the location based upon the training level of the person.

In still other embodiments, the apparatus includes a positioning processor that determines a location of a person, a processor coupled to a database that determines a hazard level of the location and that retrieves a safety criteria associated with the determined hazard level of the location and a processor that sends a wireless message to the person notifying the person to leave the location based upon a determination that the person's presence at the location does not meet the safety criteria.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
receiving a location of a person from a global positioning system (GPS) device or inertial navigation device carried by the person;
determining, via a database, a hazard level of the location;
confirming, via the database, that the person is qualified to be present at the location based at least upon a training level of the person for the determined hazard level of the location;
retrieving, via the database, a list of equipment needed at the location, wherein the equipment comprises at least one environmental test instrument;
identifying that the at least one environmental test instrument is located within an area including the location;
receiving, at the at least one environmental test instrument, test instructions for the at least one environmental test instrument;
determining that the at least one environmental test instrument is operational; and
storing information for the at least one environmental test instrument in the database.

2. The method as in claim 1, further comprising: determining that a number of other persons within a group that includes the person or a different group are located at different locations but in a same general area as the person.

3. The method as in claim 2, further comprising: determining, via the database, an alert description and targeted notification group based upon the location.

4. The method as in claim 2, further comprising: determining, via a database, an alert description and targeted notification group based upon the determined hazard level.

5. The method as in claim 1, further comprising confirming that the person has all required personal protective equipment (PPE) for the location.

6. The method as in claim 1, further comprising: reporting any audio, visual, vibrating and alarm test result failure of the environmental test instrument to the person.

7. The method as in claim 1, further comprising: reporting any maintenance reminders of the environmental test instrument or any deviations from company policy in settings of the environmental test instrument to the person.

8. The method as in claim 1, further comprising: reporting any safety violations of the person or the location of the person via an e-mail or voice mail to a safety manager or a central station operator.

9. An apparatus comprising:
- a processor that receives a location of a person from a global positioning system (GPS) device or inertial navigation device carried by the person;
- a processor that determines via a database a hazard level of the location;
- a processor that confirms via a database that the person is qualified to be present at the location based upon a training level of the person for the determined hazard level of the location;
- a processor that determines via the database a list of equipment needed at the location, wherein the equipment comprises at least one environmental test instrument;
- a processor that identifies that the at least one environmental test instrument is located within an area including the location;
- a processor that generates and sends test instructions for the at least one environmental test instrument to the at least one environmental test instrument;
- a processor that receives a response to the test instructions from the at least one environmental test instrument; and
- a processor that stores information for the at least one environmental test instrument in the database.

10. The apparatus as in claim 9, further comprising: a global positioning system, and a server, wherein the server is configured to receive the location of the person from the global positioning system.

11. The apparatus as in claim 10, further, wherein the server is further configured to confirm that the person has required personal protective equipment (PPE) for the location or notifying the person in a case where the person has a wrong PPE.

12. The apparatus as in claim 11, wherein the PPE comprises a safety lock out tag.

13. The apparatus as in claim 11, wherein the PPE comprises protective clothing.

14. The apparatus as in claim 9, further comprising: a processor that reports any deviations from company policy in settings of the environmental test instrument to the person.

15. The apparatus as in claim 9, further comprising: a processor that reports any safety violations of the person or the location of the person to a safety manager.

16. An apparatus comprising:
- a positioning processor that determines a location of a person from a global positioning system (GPS) device or inertial navigation device carried by the person;
- a processor coupled to a database that determines a hazard level of the location and that retrieves a safety criteria associated with the determined hazard level of the location;
- a processor that determines that the person has a training level the determined hazard level of the location;
- a processor that determines via the database a list of equipment needed at the location based on the safety criteria, wherein the equipment comprises at least one environmental test instrument;
- a processor that identifies that the at least one environmental test instrument is located within an area including the location;
- a processor that generates and sends test instructions for the at least environmental test instrument to the at least one environmental test instrument;
- a processor that receives a response to the test instructions from the at least one environmental, test instrument, wherein the response indicates that the at least one environmental test instrument is not operational; and
- a processor that sends a wireless message to the person notifying the person to leave the location based upon a determination that the at least one environmental test instrument is not operational.

17. The apparatus as in claim 16, wherein the safety criteria further comprises training for handling a risk associated with the location.

18. The apparatus as in claim 16, wherein the safety criteria further comprises personal protection equipment (PPE) used by the person.

* * * * *